No. 732,366. Patented June 30, 1903.

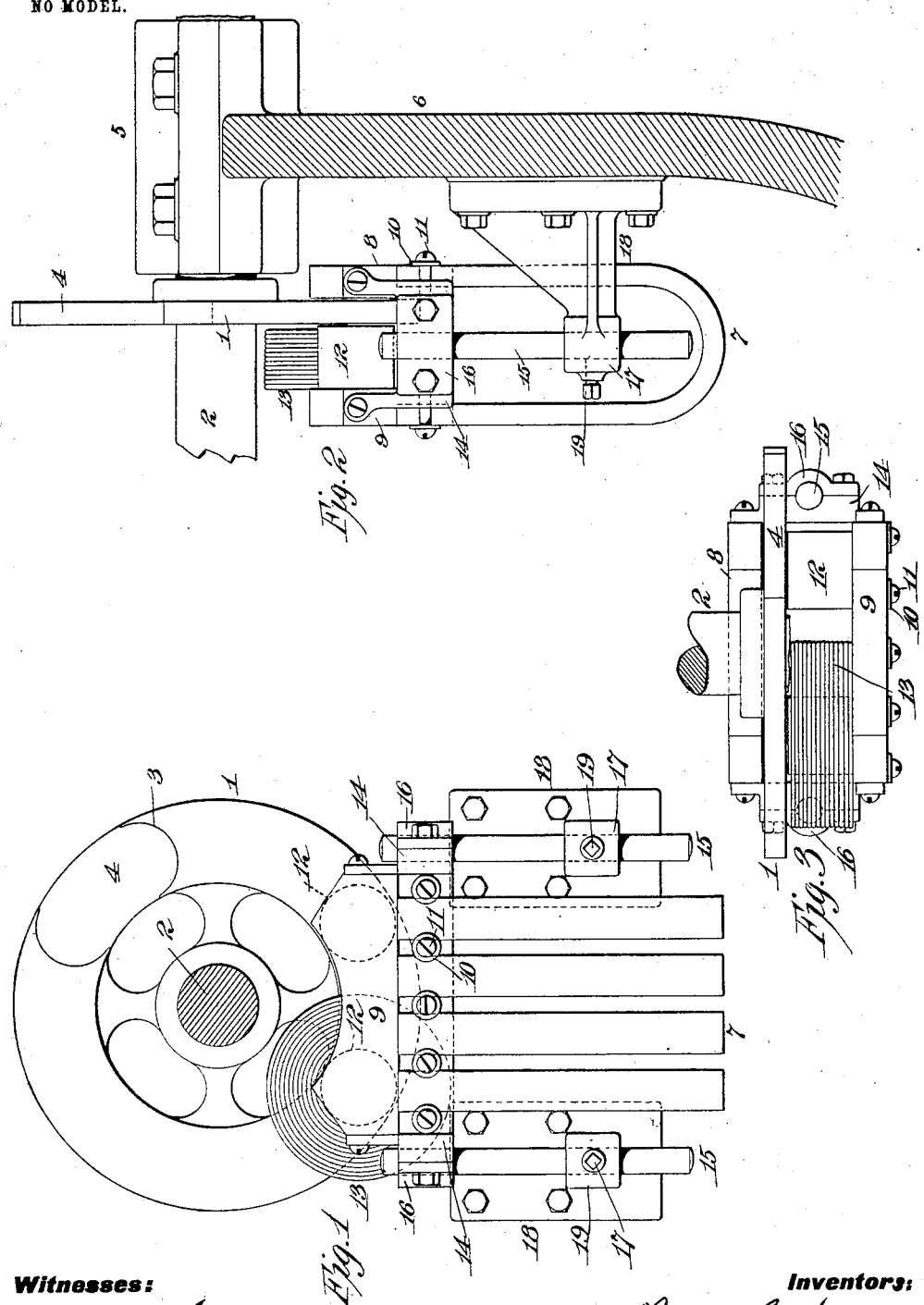

UNITED STATES PATENT OFFICE.

HERBERT G. MEARS, OF NEW YORK, AND HENRY W. AYLWARD, OF BROOKLYN, NEW YORK, ASSIGNORS, BY MESNE ASSIGNMENTS, TO THE AUTO-IGNITER COMPANY, OF NEW YORK, N. Y., A CORPORATION OF NEW JERSEY.

ELECTRIC IGNITER.

SPECIFICATION forming part of Letters Patent No. 732,366, dated June 30, 1903.

Application filed April 3, 1903. Serial No. 150,911. (No model.)

*To all whom it may concern:*

Be it known that we, HERBERT G. MEARS, residing in the borough of Manhattan, and HENRY W. AYLWARD, residing in the borough of Brooklyn, city of New York, State of New York, both citizens of the United States, have invented a certain new and useful Improvement in Electric Igniters, of which the following is a description.

Our invention relates to electric igniters for internal-combustion engines of the type invented by Le Pontois and disclosed in application for patent filed February 15, 1902, Serial No. 94,288, (renewed January 10, 1903, Serial No. 138,518,) wherein a rotating magnetic inductor having a cut-away portion is moved with respect to a coil or coils carried by a stationary magnet, so as to generate electric impulses for igniting the successive compressed explosive charges in the engine-cylinder. The special inductor described by Le Pontois was the engine fly-wheel itself; but owing to its considerable diameter its peripheral speed was relatively high, and consequently its cut-away portion would be swept past the magnet so rapidly as to generate a current during an extremely brief interval. In practice it was somewhat difficult to secure the best results from such an arrangement. Subsequent to Le Pontois it was suggested by Ganz (application filed January 29, 1903, Serial No. 140,987) to employ a separate independent inductor of relatively small diameter, so as to thereby secure a much lower peripheral speed with a consequent prolongation of the generation period.

Our present invention relates, specifically, to igniters of the Le Pontois type as modified by Ganz; and our objects generally are to improve and simplify the construction of these devices, to make them more compact, and to increase their efficiency. With all the igniters of the Le Pontois type, as suggested by Le Pontois, by Ganz, and in our own applications filed November 19, 1902, Serial Nos. 131,971 and 131,972, respectively, the pole-pieces were arranged at right angles to the axis of the inductor, so that the cut-away portion of the inductor moves successively with respect to the pole-pieces. Such an arrangement necessitated the mounting of the inductor either entirely outside or entirely within the inductor and required the spacing of the poles relatively far apart. Consequently the prior device was not as compact as is desirable in practice, nor was the field of force between the poles as concentrated as is necessary to secure the best results. With our present invention we aim to improve the device in the respects noted, and to this end we make use of a disk-like inductor of relatively small diameter and relatively thin longitudinally and formed with a cut-away portion extending through its periphery, said cut-away portion being filled with a non-magnetic material, such as phosphor-bronze or Babbitt metal, and we so arrange the magnet with respect to this inductor that the inductor shall rotate between the magnet-poles, one or more of the poles being provided with a coil or coils in which the current is generated. In this way we construct a very simple and compact device, and since the poles are separated substantially for a distance equal only to the relatively thin inductor, the field of magnetic force is very concentrated, so that the device will operate with high efficiency.

In order that the invention may be better understood, attention is directed to the accompanying drawings, forming part of this specification, and in which—

Figure 1 is a side view of our improved igniter; Fig. 2 an end view, and Fig. 3 a plan view, of the same.

In all of the above views corresponding parts are represented by the same numerals of reference.

The inductor 1 is shown as a steel-spoked wheel mounted on the shaft 2 and provided with a cut-away portion 3, which may be filled with a block 4 of non-magnetic material, such as phosphor-bronze or Babbitt metal. The shaft 2 represents the usual crank-shaft of an internal-combustion engine; but it may be obviously the cam-shaft of such an engine, in which case the engine of the ordinary type will rotate it at one-half the speed of the crank-shaft. The shaft 2 is mounted in a bearing 5, carried by an arm 6, connected to or formed with the engine-frame. The magnet as a whole is formed of a series of permanent horseshoe-magnets 7, secured to two poles 8 and 9 by washers 10 and screws 11. The pole 8 coöperates closely with one side of the inductor, as shown. The pole 9 is formed with two pole-pieces 12, one or both of which carries a coil 13, connected with the sparking apparatus of the engines either through an induction-coil or through a circuit-breaker, both of which arrangements are common in the art. It will be obvious that the pole-pieces 12 are separated from the pole 8 by a distance only slightly greater than the thickness of the inductor, so that the field of force will be concentrated and the efficiency relatively high. In order to properly support the magnet and at the same time to permit of relative adjustment of the same with respect to the inductor, we secure the non-magnetic blocks 14 between the two poles 8 and 9 and clamp adjusting-rods 15 to the same by means of bolts 16. The adjusting-rods 15 work in sleeves 17, carried on brackets 18, and are locked in any position of adjustment in said sleeves by set-screw 19.

In operation the rotation of the inductor with respect to the magnet-poles will result in the generation by induction of electric currents in the coil or coils 13, as suggested by Le Pontois, and these currents are utilized for the ignition of the successive explosive charges in any well-known way.

Having now described our invention, what we claim as new therein, and desire to secure by Letters Patent, is as follows:

1. In an electric igniter of the character described the combination with an inductor having a cut-away portion of a magnet whose poles are arranged parallel to the longitudinal axis of said inductor and a coil carried by one of the magnet-poles.

2. In an igniter of the character described, the combination with a disk-like inductor having a cut-away portion of a magnet whose poles are arranged parallel to the longitudinal axis of the inductor and a coil carried by one of the magnet-poles, substantially as set forth.

3. In an igniter of the character described, the combination with an inductor having a cut-away portion of a magnet straddling the inductor with the magnet-poles arranged parallel to the longitudinal axis of the inductor and a coil carried by one of the magnet-poles, substantially as set forth.

4. In an igniter of the character described, the combination with a disk-like inductor of a magnet straddling the inductor with the magnet-poles arranged parallel to the longitudinal axis of the inductor and a coil carried by one of the magnet-poles, substantially as set forth.

5. In an igniter of the character described, the combination with a disk-like inductor of a magnet straddling the same and between the poles of which the inductor is movable, a pole-piece carried by one of the magnet-poles and located closely adjacent to the inductor and a coil on said pole-piece.

6. In an igniter of the character described, the combination with a disk-like inductor of a magnet straddling the same and between the poles of which the inductor is movable, a plurality of pole-pieces carried by one of the magnet-poles and located closely adjacent to the inductor and a coil on one of said pole-pieces.

7. In an igniter of the character described the combination with an inductor having a cut-away portion of a magnet coöperating with said inductor, with the magnet-poles arranged parallel to the longitudinal axis of the inductor, a coil carried by one of the magnet-poles, and means for adjusting the magnet with respect to the inductor.

8. In an igniter of the character described, the combination with a disk-like inductor having a cut-away portion of a magnet straddling the inductor with the magnet-poles arranged parallel to the longitudinal axis of the inductor, a coil carried by one of the magnet-poles and means for adjusting the magnet with respect to the inductor.

This specification signed and witnessed this 17th day of March, 1903.

HERBERT G. MEARS.
HENRY W. AYLWARD.

Witnesses:
JNO. ROBT. TAYLOR,
JOHN LOUIS LOTSCH.